United States Patent [19] [11] 3,926,037
Kopito et al. [45] Dec. 16, 1975

[54] PROCESSES AND DEVICES FOR DETERMINING PROPERTIES OF BODILY MUCUS

[75] Inventors: Louis Kopito, Brookline; Samuel R. Schuster, Wellesley; Harold Kosasky, Brookline, all of Mass.

[73] Assignee: Ovutime, Inc., Wellesley, Mass.

[22] Filed: Mar. 14, 1975

[21] Appl. No.: 558,247

[52] U.S. Cl. ..................... 73/53; 23/230 B; 73/64.4; 73/150 A; 128/2 W
[51] Int. Cl.² ................... G01N 33/16; G01N 13/04
[58] Field of Search .............. 73/53, 60, 64.4, 9, 10, 73/169, 150 A, 150 R, 141 AB; 128/2 W; 23/230 B

[56] References Cited
UNITED STATES PATENTS

| | | | |
|---|---|---|---|
| 2,756,587 | 7/1956 | Doble | 73/64.4 |
| 3,036,459 | 5/1962 | Kendall | 73/141 AB X |
| 3,463,014 | 8/1969 | Katz et al. | 73/169 |

FOREIGN PATENTS OR APPLICATIONS

| | | | |
|---|---|---|---|
| 733,686 | 7/1932 | France | 73/169 |

*Primary Examiner*—Richard C. Queisser
*Assistant Examiner*—Joseph W. Roskos
*Attorney, Agent, or Firm*—Morse, Altman, Oates & Bello

[57] ABSTRACT

A device for determining the properties of a bodily mucus comprises a pair of cooperating members, the working face of each member defining a bearing surface of predetermined surface characteristics. A sample of bodily mucus is applied to the working face of one member or removed from the cervix using one of the cooperating members and the working faces are pressed together to form a plurality of mucus containing regions. The cooperating members are pulled apart. The surface area of the mucus containing regions is substantially greater than the surface area of the interface between the working faces, whereby the mucus is torn apart at the interface and is not separated from the surface of the mucus containing regions. The force required to tear the mucus at the interface defines the properties of the bodily mucus and provides an indication of menstrual cycle phase.

10 Claims, 7 Drawing Figures

PROCESSES AND DEVICES FOR DETERMINING PROPERTIES OF BODILY MUCUS

BACKGROUND OF THE INVENTION

1. Field of the Invention:

The invention relates to processes and devices for determining the properties of bodily mucus and, more particularly, is directed towards processes and devices for determining the cohesive properties of bodily mucus, chiefly cervical mucus and oral mucus, in order to predict and indicate the inception and presence of ovulation for conception control.

2. Description of the Prior Art

It has been found that mucus samples from the vaginal and oral cavities undergo distinct in-phase physiochemical changes during the menstrual cycle. Although the changes in the cervical mucus are much more noticeable than the changes in the oral mucus, both changes are readily determinable. During the immediate preovulatory phase, for a period of one to three days under estrogen domination, the mucus is profuse and watery. During the postovulatory phase, under progestation, the mucus becomes less abundant and highly viscous. In healthy women with normal menstrual cycles, as is well documented in the medical literature, ovulation usually occurs between the 12th and 14th day prior to the next menstrual period. Specifically, cervical mucus is most hydrated (97 to 98% water) at the time of ovulation and is relatively dehydrated (80 to 90% water) at other times. The solid residue present after desiccation may range from 2% during ovulation to 20% at other times, a ten fold increase. Determining ovulation on the basis of the preceeding menstrual period, such as in the rhythm method of counting the days ellapsed between the termination of the menstrual period phase and the presumed mid-cycle ovulatory phase, is prone to errors because of the great variability of the duration of this proliferative phase. Although it is possible to predict or to determine ovulation on the basis of hormonal changes in the blood or chemical changes in the mucus, present procedures for such analyses have had limited use because they usually provide the answer after the event. Since present procedures are lengthly and costly, they are utilized only in special cases. A need has arisen for expeditious processes and devices that are capable of providing data for prediction or confirmation of ovulation during or within a few minutes following examination of a patient.

SUMMARY OF THE INVENTION

It is an object of the present invention to provide processes and devices for determining the properties of a bodily mucus, particularly cervical mucus and oral mucus, in order to predict and to indicate the inception and presence of ovulation. One such device comprises a pair of cooperating circular members, each member having a working face that defines a bearing surface of predetermined surface characteristics, for example peaks and valleys. In one process, a sample of bodily mucus is applied to the working face of one member or one of the members is used to obtain the specimen from the cervical cavity. Next, the working faces are pressed together so that the peaks of one member are disposed longitudinally and the peaks of the other member are disposed latitudinally, a plurality of mucus containing regions being formed between the working faces. Then, the cooperating members are pulled apart. The surface area of the mucus containing regions is substantially greater than the surface area of the interface between the working faces. In consequence of the smaller surface area of the interface, the mucus is torn apart at the interface and is not separated from the surface of the mucus containing regions. Finally, the properties of the bodily mucus, which provides an indication of menstrual cycle phase, is determined by noting the force required to tear apart the mucus at the interface of the mucus containing regions.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Human and animal cervical mucus are a non-homogeneous hydrogel composed primarily of water, proteins, carbohydrates, electrolytes and several minor components which may be present or absent such as bacteria, blood and exfoliated epithelial cells. The concentration of these components is variable and influenced by cyclical changes of the menstrual cycle. At or near the time of ovulation, the water content of the mucus is maximal, in the range of 96 to 98%. Conversely, the concentration of the other components, with the exception of NaCL and some other electrolytes, is minimal. The total solids content of the mucus at mid-cycle is about 2% and the total solids content at other times is 5–20%. The higher solids content, particularly the increase in proteins and carbohydrates, results in a more cohesive mucus. Typically, during the proliferative and secretory phases the water content may drop to 80%, and therefore the other components or dry matter may increase to 20%. Proteins and carbohydrates increase by a factor of 10 to 15 and the mucus is enriched by the presence of an ever-increasing concentration of cellular material until the time of menstruation and for several days after. The high water content of the mucus at mid-cycle, in addition to the previously mentioned factors, is the main contributor to the fluidity and lubricity of the mucus. All of the above cyclical physio-chemical alterations may serve to indicate approaching ovulation. In particular, the rheological properties of the mucus, for example viscosity, surface tension and yield point, undergo sharp and abrupt daily changes for one to three days prior to and one or two days following ovulation.

The ultrastructure of mucus shows a complex network of intertwined macromolecular filaments of glycoprotein fibers ranging in thickness from about 700A to 6000A. This mesh of disoriented fibers lacks axial direction except when the material is pulled in one direction while the opposite region is firmly anchored. Under this condition, the fibrils assume axial orientation in the direction of the applied force and may be stretched to considerable length. The fiber bundles from mucus obtained at midcycle are visco-elastic and may be extended 5–20 cm. During the premenstrual and postmenstrual periods, the fiber bundles are somewhat inelastic and usually snap after a short expansion. The present invention provides methods and devices for indicating the properties of a bodily mucus sample by identifying the short and intense changes corresponding to the period of ovulation from other cyclic events as a function of the linear cohesive force required to tear apart the mucus sample.

Figure 1:
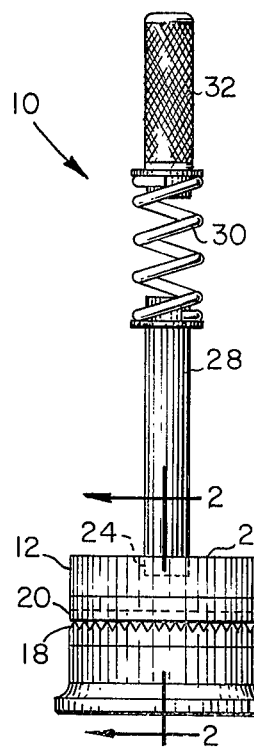
FIG. 1 is a front elevation of a device embodying the invention for determining the properties of a bodily mucus sample.
Figure 2:
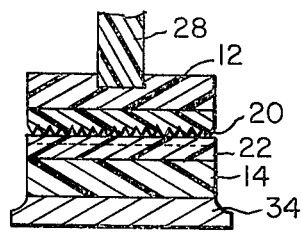
FIG. 2 is a sectional view taken along the lines 2—2 of FIG. 1.
Figure 3:
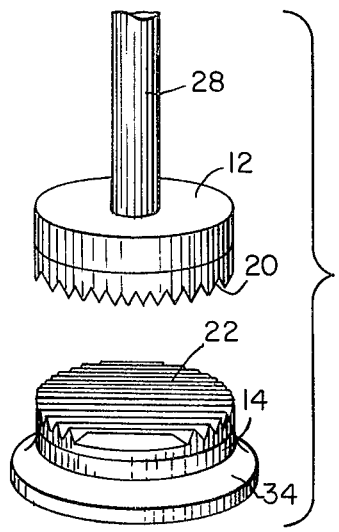
FIG. 3 is a perspective view of the device of FIG. 1.

Referring now to the drawings, particularly FIGS. 1, 2 and 3, there is shown one embodiment of the invention in the form of a device 10 comprising a pair of seperable cooperating members 12 and 14 having working faces 16 and 18, respectively. Members 16 and 18 are composed of a dimensionally stable, sterilizable material, for example a vitreous material such as glass, a metallic material such as stainless steel, or a plastic material such as methyl methacrylate. Each working face defines a bearing surface of predetermined surface characteristics having valleys and peaks of prismatic or other regular cross section, the average valley to peak height being in the range of 0.002 to 2.0 mm. Such a surface in various embodiments, is characterized by a predetermined depth and is provided by machining or etching random valleys and peaks or machining or etching regularly spaced prismatic facets or regular geometric shapes and the like. In the illustrated embodiment, by way of example, the predetermined surface of bearing surface 16, which is disposed at the lower face of member 12, is in the form of a plurality elongated members 20 that are in spaced paralled relationship with one another, each elongated member 20 having a triangular cross-sectional profile occurring at a rate of 50 to 1000 cycles per cm. In the illustrated embodiment, by way of example, the predetermined surface of bearing surface 18, which is disposed at the upper face of member 14, is in the form of a plurality of elongated members 22 that are in spaced parallel relationship with one another, each elongated member 22 having a triangular cross-sectional profile occurring at a rate of 50 to 1000 cycles per cm.

Figure 4:
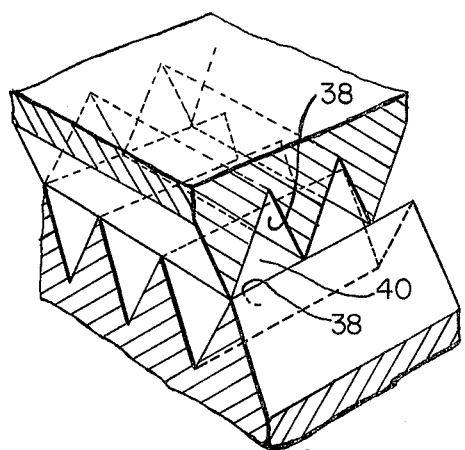
FIG. 4 is a perspective, somewhat exaggerated, of a mucus containing region.

Member 12, which in the illustrated embodiment has a substantially circular profile having a diameter in the range of 0.5 to 4.0 cm, is formed with an axial opening 24 at an upper face 26. One end of a rod 28 is pressed or threaded into opening 24, rod 28 projecting outwardly from and in perpendicular relationship with face 26. One end of a resilient element 30, for example a spring, is secured to the free end of rod 28. The other end of spring 30 is fastened to a rod 32, which is coaxial with rod 28. Rods 28 and 32 are composed of a suitable plastic such as methyl methacrylate or polycarbonate. A bias element 34, for example a gravitational load having a weight in the range of 10 to 1000 grams, is mounted to member 18 at the lower face thereof. The weight of gravitational load 34 is related to the size and configuration of members 12 and 18. The profile of member 18 conforms substantially to the profile of member 12. One process of the present invention, hereinafter described, involves the use of device 10 for determining the properties of cervical mucus in order to predict and indicate the inception and presence of ovulation. First, a sample of cervical mucus is obtained by inserting member 12 into the vaginal canal and holding bearing surface 16 against the cervical os. Next, member 12 is removed from the vaginal cavity, a sample of cervical mucus contained on bearing surface 16. Next, immediately after removal of member 12, bearing surface 16 is placed on and pressed against bearing surface 18, whereby the mucus sample is spread on the bearing surfaces. Bearing surface 16 is placed on bearing surface 18 in such a manner that the longitudinal axis of each elongated member 20 is disposed in substantially perpendicular relationship with respect to the longitudinal axis of each elongated member 22. When members 16 and 18 are pressed together, a plurality of mucus containing regions 36 are formed therebetween, one of such regions being shown in FIG. 4, somewhat exaggerated. The surface area of each mucus containing region is substantially greater than the surface area of the interface between the bearing surfaces, the surfaces of region 36 being denoted by reference character 38 and the interface being denoted by reference character 40. When the bearing surfaces are pressed together, the mucus sample is spread to the boundary surfaces of regions 36, the bearing surfaces being operative to provide an even thickness of the spread mucus. Next, rod 32, which is provided with a roughened or knurled outer surface 42, is pulled upwardly or in a direction that is substantially perpendiuclar to the plane of the interface between members 16 and 18. During ovulation, and for two days preceeding and following ovulation, the mucus is profuse and watery. During this time frame, the weight of bias element 34 is sufficiently heavy to cause the mucus to be torn apart at interface 40 when rod 32 is lifted. At other times, the mucus is more viscous and tacky. During this other time frame, the weight of bias element 34 is insufficient to cause the mucus to be torn apart. In this case, the bearing surfaces remain attached by the tacky mucus and bias element 34 is lifted when rod 32 is pulled upwardly. Spring 30 is operative to prevent shock loading during matching of the members 16 and 18, and during separation of the members. Finally, in accordance with the just described process, periods of fertility are indicated when bias element 34 is not lifted and periods of infertility are indicated when bias element 34 is lifted. Preferably, the above described process is perfoemed in less than ten seconds.

Figure 5:
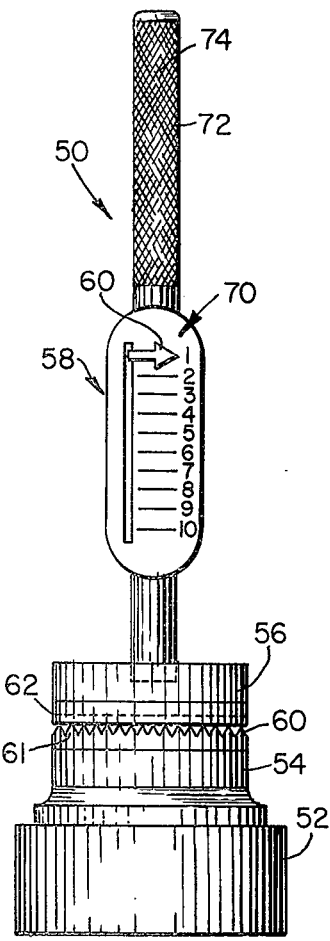
FIG. 5 is front elevation of an alternate embodiment of the invention.

Referring now to FIG. 5, there is shown an alternate embodiment of the invention in the form of a device 50. Generally, device 50 comprises a base 52 in which a lower bearing member 54 is mounted. An upper bearing member 56, which carries a force measuring device 58, rests on lower bearing member 54. Upper bearing member 56 and lower bearing member 54 define a pair of separable cooperating bearing members. Lower bearing member 54 includes a bearing surface 60 of predetermined surface design having valleys and peaks, the average valley to peak height being in the range of 0.002 to 2.0 mm. Such a surface, in various embodiments, is provided by machining or etching random valleys and peaks or machining or etching regularly spaced valleys and peaks, such as prismatic facets, regular geometric shapes and the like. In the illustrated embodiment, by way of example, the predetermined surface of bearing surface 60 is in the form of a plurality of elongated members 61 that are in spaced parallel relationship with one another, each elongated member having a triangular cross-sectional profile occurring at a rate of 10 to 1000 cycles per cm.

Upper bearing members 56 includes a bearing surface 62 of predetermined surface characteristics having valleys and peaks, the average valley to peak height being in the range of 0.002 to 2.0 mm. Such surface configurations, in various embodiments, are provided by machining or etching random valleys and peaks or machining or etching regularly spaced valleys and peaks, such as prismatic regular geometric shapes and the like. In the illustrated embodiment, by way of example, the predetermined surface configuration of bearing surface 62 is similar to the predetermined surface configuration of bearing surface 60, both bearing surfaces lying in substantially horizontal planes. Bearing surface 60 and 62 are characterized by like profiles, for example a circular profile having a diameter in the range of 0.5 to 4.0 cm.

Force measuring device 58, for example a spring scale, is mounted to upper bearing member 56 means of a rod 64, which is pressed or threaded into an axial opening 66 formed in the upper bearing member. Spring scale 58 is provided with an indicator 68 that points towards indicia 70, for example a scale having the numerals 1 to 10. A rod 72 is mounted to spring scale 58 at an upper end thereof, rod 72 defining a grip for applying an upwardly directed force. The surface of rod 72 is roughened or knurled as shown at 74.

One process of utilizing device 50 is as follows. First, a sample of mucus is obtained by inserting bearing member 56 into the vaginal canal and holding bearing surface 62 against the cervical os. Next, bearing member 56 is removed from the vaginal cavity, a sample of cervical mucus contained on bearing surface 62. Next, immediately after removal of bearing member 56, bearing surface 62 is placed on and pressed against bearing surface 60 in substantially the same manner as described in connection with device 10, for forming mucus containing regions. Then, rod 72 is pulled upwardly. Base 52 is sufficiently heavy so that base 52 and lower bearing member 54 are not lifted when rod 72 is pulled upwardly. Finally, an indication of period of fertility or infertility is presented by the reading of scale 70 on indicator 68 when the mucus sample is torn apart. Lower scale readings, for example one to three, indicate periods of fertility and higher scale readings, for example five to ten, indicate periods of infertility.

Figure 6:
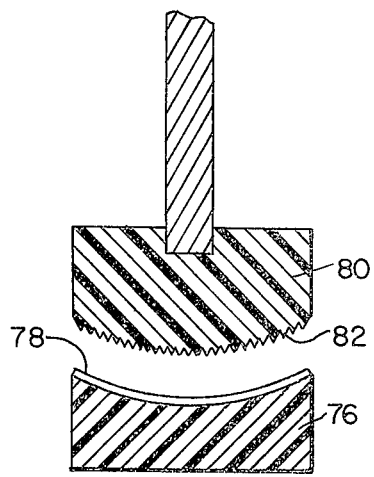
FIG. 6 is a sectional view of another alternate embodiment of the invention.
Figure 7:
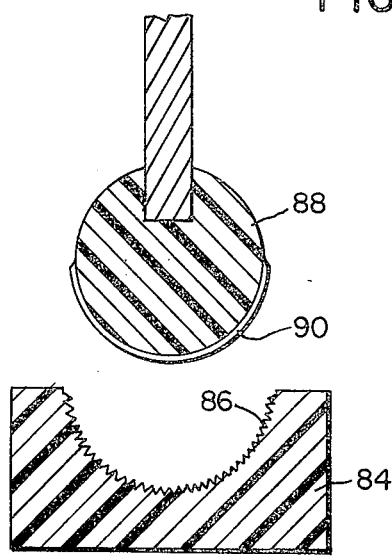
FIG. 7 is a sectional view of yet another embodiment of the invention.

Alternative bearing member configurations are shown in FIGS. 6 and 7. FIG. 6 depicts a lower bearing member 76 having a generally concave bearing surface 78 and an upper bearing member 80 having a generally convex bearing surface 82 that is adapted for interaction with bearing surface 78. Lower bearing member 76 and upper bearing member 80 define a pair of separable cooperating bearing members. Each bearing surface has a predetermined configuration that is provided by machining or etching random valleys and peaks or machining or etching regularly spaced valleys and peaks, such as prismatic facets, regular geometric shapes and the like. The average valley to peak height is in the range of 0.002 to 2.0 mm.

FIG. 7 shows a lower bearing member 84 having a hemispherical bearing surface 86 and an upper spherical bearing member 88 having a generally hemispherical bearing surface 90 that is adapted for interaction with bearing surface 86. The spacing or tolerance between bearing surfaces 86 and 90 ranges from 0.001 to 2.0 mm and preferably from 0.01 to 0.5 mm. Lower bearing member 84 and upper bearing member 88 define a pair of separable cooperating bearing members. Each bearing surface has a predetermined finish of the type described in connection with bearing surface 78 and 82. Preferably, each bearing member 76, 80, 84 and 88 is composed of a dimensionally stable, sterilizable material, for example, a vitreous material such as glass, a metallic material such as stainless steel, or a plastic material such as methyl methacrylate. The bearing members shown in FIGS. 6 and 7 are interchangeable with the bearing members shown in FIGS. 1 and 5, the processes described for devices 10 and 50 being applicable when the bearing members of FIGS. 6 and 7 are used.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A device for determining the properties of bodily mucus comprising:
   a. a pair of separable cooperating members, each said member having a working face defining a bearing surface of predetermined configuration, said bearing surfaces in face to face relationship define a plurality of regions adapted to contain a bodily mucus sample, the surface area of said regions being greater that the surface area of the interface between said bearing surfaces; and
   b. indicating means operatively connected to at least one of said members for providing an indication of the force required to separate said members when said regions contain a bodily mucus sample, the force required to separate said bodily mucus sample at said interface defines the property of said bodily mucus.

2. The device as claimed in claim 1 wherein the predetermined finish of each said bearing surface includes peaks and valleys, the average peak to valley height being in the range of 0.002 to 2.0 mm.

3. The device as claimed in claim 1 wherein said predetermined surface configuration of each said bearing surface is in the form of a plurality of elongated members in spaced parallel relationship to one another, each said elongated member having a substantially triangular profile in right cross section occurring at a rate of 50 to 1000 cycles per cm.

4. The device as claimed in claim 1 wherein said indicating means includes a gravitational load operatively connected to one of said members, said gravitational load having a weight in the range of 10 to 1000 grams.

5. The device as claimed in claim 1 wherein said indicating means includes a force measuring device operatively connected to one of said members, said force measuring device having indicia defining a scale.

6. A process for determining the properties of bodily mucus, said process comprising the steps of:
   a. placing the bodily mucus on at least one of a pair of separable cooperating members;
   b. pressing said cooperating members together to form a plurality of mucus containing regions, the surface area of said mucus containing regions being greater that said surface area of an interface between said cooperating members;
   c. applying a force to at least one of said cooperating members, said force tending to cause relative motion of said cooperating members with respect to each other; and
   d. indicating the occurrence of said relative motion for determining the properties of said bodily mucus.

7. The process as claimed in claim 6 wherein each said cooperating member has a working face defining a bearing surface of predetermined finish to form said plurality of mucus containing regions when said cooperating members are pressed together.

8. The process as claimed in claim 7 wherein each of said bearing surfaces is formed with peaks and valleys, the average peak to valley height being in the range of 0.002 to 2.0 mm.

9. The process as claimed in claim 6 wherein said force applying step includes the step of lifting one of said cooperating members, a gravitational load having a weight in the range of 10 to 1000 grams being connected to the other of said cooperating members.

10. The process as claimed in claim 6 wherein said force applying step includes the step of lifting one of said cooperating members, the other of said cooperating members being fixed against movement, the occurrence of relative motion being indicated on a force measuring device operatively connected to said one cooperating member.

* * * * *